United States Patent
Schroeder et al.

(10) Patent No.: US 9,440,651 B2
(45) Date of Patent: Sep. 13, 2016

(54) METHOD AND DEVICE FOR MONITORING A SETPOINT TRAJECTORY OF A VEHICLE

(71) Applicant: Robert Bosch GmbH, Stuttgart (DE)

(72) Inventors: Christoph Schroeder, Pleidelsheim (DE); Florian Hauler, Linkenheim (DE); Oliver Pink, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/725,141

(22) Filed: May 29, 2015

(65) Prior Publication Data

US 2015/0353084 A1 Dec. 10, 2015

(30) Foreign Application Priority Data

Jun. 5, 2014 (DE) .................. 10 2014 210 752

(51) Int. Cl.
*G06F 17/10* (2006.01)
*B60W 30/095* (2012.01)
*B60W 40/04* (2006.01)

(52) U.S. Cl.
CPC .......... *B60W 30/0956* (2013.01); *B60W 40/04* (2013.01); *B60W 2550/00* (2013.01); *B60W 2550/10* (2013.01)

(58) Field of Classification Search
USPC .......................................................... 701/301
See application file for complete search history.

(56) References Cited

U.S. PATENT DOCUMENTS

| 2008/0189040 | A1* | 8/2008 | Nasu | G08G 1/163 701/301 |
| 2015/0329112 | A1* | 11/2015 | Jeon | B60W 30/09 701/41 |

* cited by examiner

*Primary Examiner* — Hussein A. Elchanti
(74) *Attorney, Agent, or Firm* — Norton Rose Fulbright US LLP

(57) ABSTRACT

A method for monitoring a setpoint trajectory of a vehicle, including the following: recording the surroundings of the vehicle, ascertaining a clearance based on the recorded surroundings and checking the setpoint trajectory for freedom from collision, based on the clearance, in order to ascertain whether traveling on the setpoint trajectory would result in a collision or not. Also described is a device for monitoring a setpoint trajectory of a vehicle and a related computer program.

26 Claims, 4 Drawing Sheets

METHOD AND DEVICE FOR MONITORING A SETPOINT TRAJECTORY OF A VEHICLE

RELATED APPLICATION INFORMATION

The present application claims priority to and the benefit of German patent application no. 10 2014 210 752.0, which was filed in Germany on Jun. 5, 2014, the disclosure of which is incorporated herein by reference.

FIELD OF THE INVENTION

The present invention relates to a method and a device for monitoring a setpoint trajectory of a vehicle. In addition, the present invention relates to a computer program.

BACKGROUND INFORMATION

In highly automated driving, a monitoring of the setpoint trajectory calculated by the vehicle is essential for safety reasons before the vehicle drives along it. Usually, the situation is basically that the setpoint trajectory is checked for collisions with all detected objects. If a setpoint trajectory should lead to a collision, this trajectory would not be rated as a sensible choice, and would not be traveled. It is, however, generally difficult to determine an actual size, particularly a width and a length, of objects. Particularly surround sensors, such as a radar sensor or a mono camera, are normally at best able to recognize that an object is located somewhere within the visual range. Normally, the sensor is not able to determine the exact contour of the object. Thus, checking setpoint trajectories based on detected objects is difficult.

The aforementioned surround sensors are also not able to provide the information as to whether there actually exists nothing else all the way to the object. This is essentially due to the fact that usually object sensors are used. For this reason, in addition, active clearance sensors may also be used, which measure the clearance directly. Objects are an approximation of the entire "occupied space", but do not really image it (because of the limited capabilities of the sensor). In particular, object sensors may overlook objects, which usually presents a great problem. When clearance sensors overlook a clearance, it is no problem from a safety technology point of view.

SUMMARY OF THE INVENTION

The object on which the present invention is based may therefore be seen as providing a method for monitoring a setpoint trajectory which enables a more simple checking of the setpoint trajectory for freedom from collision.

The object on which the present invention is based may also be seen in indicating a corresponding device for monitoring a setpoint trajectory.

The object on which the present invention is based may also be seen in providing a corresponding computer program.

These objects are attained by the respective subject matter of the independent claims. Advantageous embodiments of the present invention are the subject matter of the respective dependent claims.

According to one aspect, a method is provided for monitoring a setpoint trajectory of a vehicle, including the following steps:

detecting the surroundings of the vehicle,
ascertaining a clearance based on the detected surroundings and
checking the setpoint trajectory for freedom from collision, based on the clearance, in order to ascertain whether traveling on the setpoint trajectory would lead to a collision or not.

According to one further aspect, a device for monitoring a setpoint trajectory of a vehicle is provided, including:

a recording device for recording surroundings of the vehicle and
a processing device for ascertaining a clearance based on the detected surroundings and for checking the setpoint trajectory for freedom from collision based on the clearance, in order to be able to ascertain whether driving on the setpoint trajectory would lead to a collision or not.

According to yet another aspect, a computer program is provided, which includes program code to execute the method for monitoring setpoint trajectory of a vehicle, when the computer program is run on a computer.

According to another aspect, a vehicle is provided which includes the device for monitoring a setpoint trajectory of a vehicle.

In an advantageous manner, a model-independent and reliable monitoring of setpoint trajectories is made possible. This happens, in particular, in that the setpoint trajectory is checked by a clearance measurement for freedom from collision and not, as in the related art, based on the sizes of detected objects in the surroundings of the vehicle. It is usually not of interest what exactly is located in the not free (not drivable) space (and what contour an existing object has, the contour of the object playing at most a very subordinate role for trajectory planning). What is important for checking the setpoint trajectory is, which may be exclusively, that it has been planned or ascertained in a free (drivable) space. That is, because the checking of the setpoint trajectory for freedom from collision is carried out based on the clearance, in an advantageous manner, the shortcomings of known surround sensors, that these are usually not able to determine an accurate contour of objects, are compensated for. A reliable monitoring of setpoint trajectories is thereby effected. This is advantageous particularly if the present invention is used within the scope of an automated travel of the vehicle. In such travel, the vehicle is no longer controlled or guided by the driver. Rather, in an automated travel of the vehicle, the vehicle is steered or guided in an automated and autonomous way, i.e. independently. (The vehicle is operated in an automated driving mode). Consequently, according to one specific embodiment, it is provided that the steps of the method be carried out during an automated travel of the vehicle. Correspondingly, the device is configured to carry out the method steps when the vehicle is operated in an automated driving mode, that is, when it is being guided in automated fashion.

It is noted that, according to one specific embodiment, the surround sensor, in order to measure the clearance, measures actively, i.e. exclusively, only what is free (that is, it is configured exclusively to measure what is free), i.e. it is configured never to overestimate the clearance, but, if anything, only to underestimate it and to make no object assumptions. (The statement: I see an object 20 m away, that is, "up to that point there must be clearance," is, for example, not a statement of a surround sensor configured as a clearance sensor).

According to one specific embodiment it is provided that the clearance is based on a grid or particles. A particle-based clearance is usually subdivided into a grid, the cells of the grid each having a variable which is a probability that this cell is occupied by an object. Essentially, static scenarios are well covered. The approach of using a particle filter also allows treating both static and dynamic situations using the same approach.

According to another specific embodiment, it is provided that a configuration space be ascertained based on the clearance, the configuration space being a space which describes collision-free trajectories of the vehicle, the setpoint trajectory being checked for collision freedom in the configuration space. Using such a configuration space yields the technical advantage that a checking of the setpoint trajectory for freedom from collision is able to be carried out directly, in a rapid and reliable manner. This is so because the configuration space is precisely a space which describes collision-free trajectories of the vehicle. That is to say that all the trajectories that run in the configuration space do not result in a collision.

In another specific embodiment, it is provided that, for ascertaining the configuration space, a free area of the grid-based clearance be convoluted with a vehicle model of a vehicle size and a vehicle orientation, so that the configuration space is ascertained as a grid including several cells, which are all marked as being drivable, it being checked, in order to check the setpoint trajectory for being collision-free, whether the setpoint trajectory lies completely in the grid or not.

That is to say that a vehicle size and a vehicle orientation are advantageously taken into account for ascertaining the configuration space. This is particularly based on the convolution. Thus, it may advantageously be ensured that objects located at the boundary of the clearance, but outside the clearance, do not collide with the vehicle when it is located at the boundary of the clearance, but within the clearance, based on its spatial extension and based on its corresponding orientation in the space. The convolution may be carried out for all possible orientations of the vehicle. In particular, a multi-dimensional configuration space is thus ascertained. The knowledge of the dimensions of the vehicle (vehicle sizes) is normally necessary. In the context of this description, the term "model independence" refers to the fact that the measurement of the clearance per se does not depend on models of the other road users to be measured (for example, a stereo camera makes great model assumptions for measurement, whereas a lidar more likely does not). Models are always inaccurate and image reality in a reduced manner, which is why they should be avoided. A "model" of one's own vehicle is very exact, however, and accurate to the nearest mm. Therefore it is not a model, but simply the vehicle extension.

The configuration space is an n-dimensional hyperspace, which is formed or ascertained by the independent degrees of freedom of a system (in this case, the vehicle in its surroundings). Each actual motion represents a trajectory in the configuration space. In contrast to a phase space, the configuration space does not image the impulse of the individual elements (for instance, obstacles or other objects in the surroundings), which is why only the current configuration or the current state of the system is shown, whereas the further motion of the individual elements cannot be derived.

Thus a grid is advantageously formed having an appropriate scaling and dimensioning, in which the freedom or drivability of a cell of the grid is indicated by the fact that the cell lies completely in the configuration space. Thus, the grid is a space which describes all the collision-free trajectories of the vehicle.

Consequently, a setpoint trajectory which lies entirely in the grid does not result in a collision. For all the cells of the grid are marked as free or as drivable. In this connection, a setpoint trajectory defines, from a start to a destination, a sequence of adjacent points in the configuration space, that is, in the grid.

According to a further specific embodiment, it is provided that the surroundings of the vehicle in each case be recorded using a plurality of surround sensors, only those regions of the surroundings being marked as drivable in which all the surround sensors have detected no objects, so that the clearance includes exclusively the regions marked as drivable.

This yields in particular the technical advantage that an exclusion criterion is defined for drivable regions. It is an exclusion criterion because a region for which only one of the surround sensors indicates that it is occupied by an object, can no longer be indicated as free. This is so regardless of whether all other surround sensors have indicated exactly this region as being drivable. Thus, in an advantageous manner, a safety is increased for a determination as to whether a region is free or not free.

There are two types of surround sensors, for example: object sensors and explicit clearance sensors. Object sensors measure objects, and in that case, the exclusion criterion, mentioned above, applies. Clearance sensors explicitly measure clearances, in that they measure directly the ground using several laser beams running one above the other, for example. In this way it may be ensured that there is no object located between two laser beams, that is, the region is free. Consequently, according to one specific embodiment it is provided that at least one surround sensor of each sensor class (object sensor and clearance sensor) is provided. This is advantageous for checking the trajectory.

According to one further specific embodiment, surround sensors may be formed to be the same or different, for example.

According to one specific embodiment, surround sensors are elements selected from the following group of surround sensors: A radar sensor, ultrasonic sensor, lidar sensor, infrared sensor, video sensor, in particular, a video sensor or video sensors of a stereo camera or a video sensor of a mono camera.

According to one specific embodiment, the surround sensor (or the surround sensors) is/are a clearance sensor, which is configured to measure a clearance. That is to say that the clearance sensor is able to measure the clearance in the surroundings of the vehicle, i.e. it measures it. The clearance sensor is a lidar sensor, for example, which may be a multi-plane lidar sensor.

Specific embodiments with regard to the method derive analogously from the specific embodiments with regard to the device, and vice versa. That is to say that features, advantages or specific embodiments with respect to the method result from the specific embodiments with respect to the device, and vice versa. That is to say, in particular, that the device is especially configured to carry out the method according to the present invention. Accordingly, the recording device is configured correspondingly. Accordingly, the processing device is configured correspondingly. The recording device thus includes, in particular, several surround sensors. The present invention will be explained in greater detail in the following text with reference to the exemplary embodiments.

In the following text, the same reference numerals may be used for the same features.

DETAILED DESCRIPTION

Figure 1:
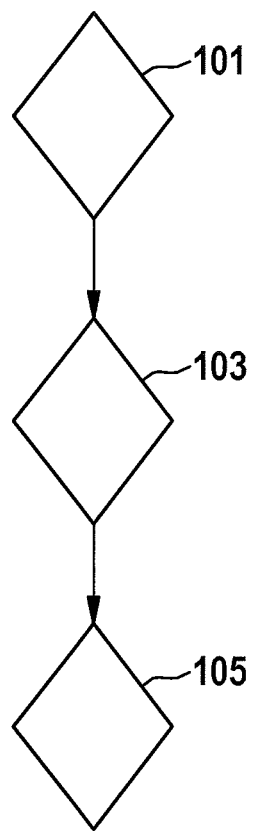
FIG. 1 shows a flow chart of a method for monitoring a setpoint trajectory of a vehicle.

FIG. 1 shows a flow chart of a method for monitoring a setpoint trajectory of a vehicle.

According to a step 101, a surroundings of the vehicle is recorded. In a step 103, a clearance is ascertained based on the recorded surroundings. In a step 105, the setpoint trajectory is checked for freedom from collision, based on the ascertained clearance, in order to ascertain whether driving on the setpoint trajectory would result in a collision or not.

Depending on the result of the check, it may be provided, for example, that the setpoint trajectory be discarded, a new setpoint trajectory being ascertained, which may subsequently be checked in turn, analogously, for freedom from collision. The setpoint trajectory is, in particular, ascertained or calculated using a setpoint trajectory calculating device, which may be included in a device according to the present invention. The setpoint trajectory is ascertained, in particular, based on a recorded surroundings.

Figure 2:
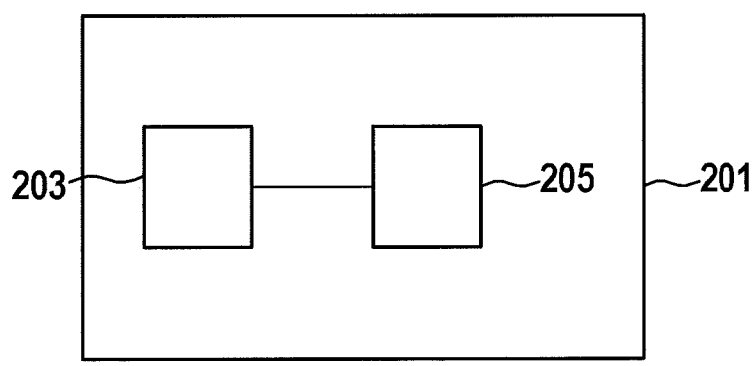
FIG. 2 shows a device for monitoring a setpoint trajectory of a vehicle.

FIG. 2 shows a device 201 for monitoring a setpoint trajectory of a vehicle.

Device 201 includes a recording apparatus 203 for recording the surroundings of the vehicle. Device 201 further includes a processing device 205 for ascertaining a clearance based on the recorded surroundings and for checking the setpoint trajectory for freedom from collision based on the clearance, in order to be able to ascertain whether driving on the setpoint trajectory would result in a collision or not.

In one specific embodiment (not shown), recording device 203 includes a plurality of surround sensors. The device may be configured to carry out the method according to the present invention.

Figure 3:
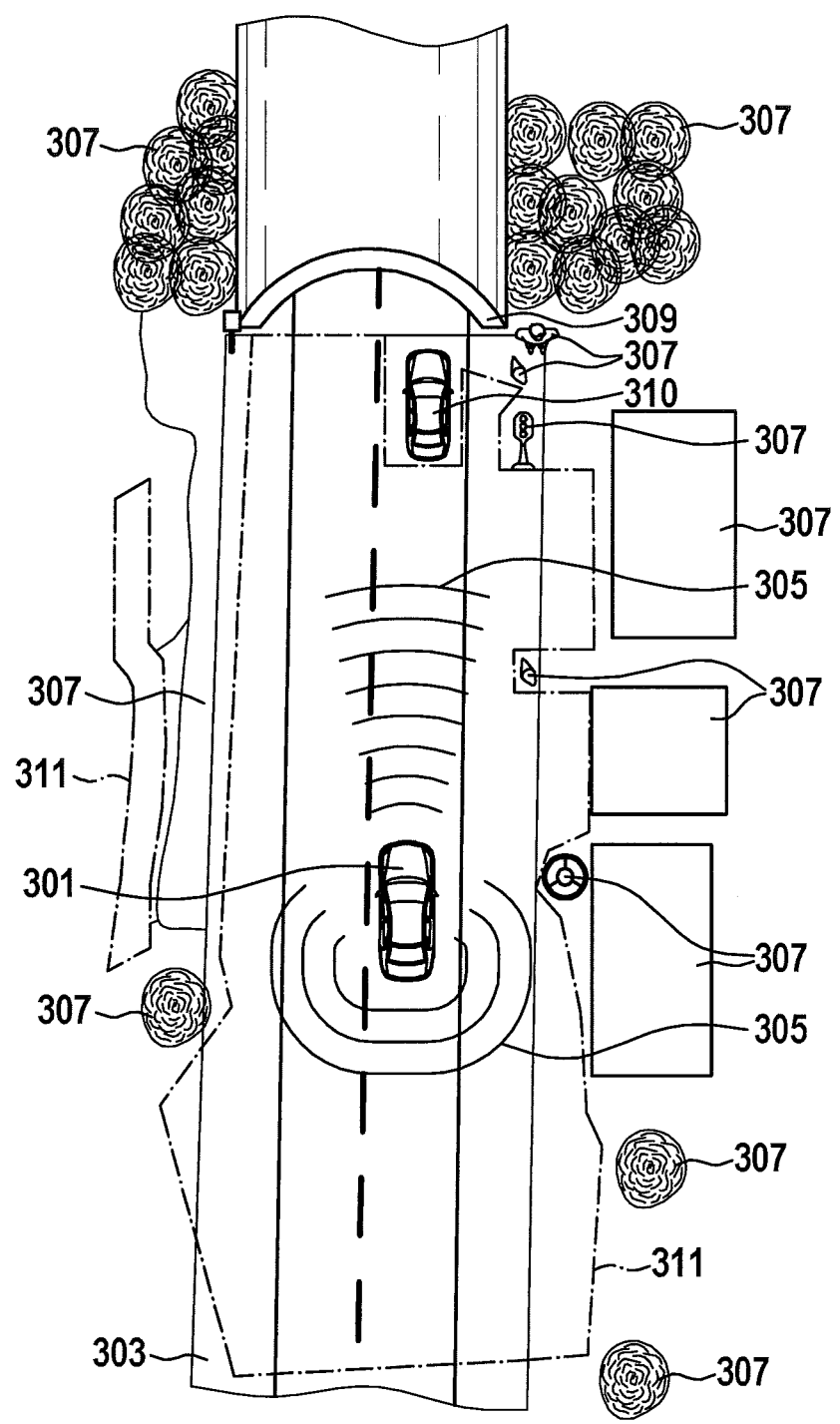
FIG. 3 shows a measurement of a clearance.

FIG. 3 shows a vehicle 301 traveling on a road 303. Reference numeral 305 points to wave-like drawing elements, which are supposed to show symbolically that vehicle 301 is recording its surroundings by sensor, using one or more surround sensors. This is done using a recording device of an apparatus according to the present invention. That is to say that vehicle 301 includes the apparatus according to the present invention. This is not shown in FIGS. 3 to 5, for the sake of clarity.

Reference numerals 307 point to objects which are located in the surroundings of vehicle 301. Reference numeral 309 points to a tunnel, towards which vehicle 301 is traveling. Reference numeral 310 points to a vehicle which is located in front of a tunnel entrance of tunnel 309 on road 303.

Using the recording device, the surroundings of vehicle 301 are thus recorded by sensor, so that a clearance is able to be ascertained based on the recorded surroundings. This clearance is indicated by reference numeral 311. That is to say that no objects are located in clearance 311. Thus, clearance 311 corresponds to a free or drivable travel area.

If the ascertained clearance is a grid-based clearance, that is, if the corresponding clearance is able to be represented in a grid-based manner, a check for freedom from collision may look as follows:

In a first step, a configuration space is calculated, for example, (it may be calculated, for example, by essentially convoluting the free area with a model (with respect to the size and orientation) of vehicle 301. This may be carried out for all possible orientations of vehicle 301 and results in a multi-dimensional configuration space. The configuration space is the n-dimensional hyperspace which is formed by the independent degrees of freedom of a system. Each actual motion represents a trajectory in the configuration space. In contrast to a phase space, the configuration space does not image the impulse of the individual elements (in this case, for instance, objects 307 and further vehicle 310), which is why only the current configuration or the current state of the system, respectively, is represented, whereas the further motion of the individual elements cannot be derived.

A grid having an appropriate scaling and dimensioning is thereby formed, in which the freedom or drivability respectively of a cell of the grid is characterized in that the cell lies completely in the configuration space. That is, the grid includes several cells and is thus a space which describes all collision-free trajectories of vehicle 301.

Appropriate, in this connection, means particularly depending on the dimensions of the expected objects in the surroundings: If only vehicles are expected (for instance, on a freeway), grid tiles (i.e. cells) having a size of 50 cm×50 cm are sufficient, but when one is moving about with pedestrians in urban scenarios, tiles are required that are at most 10 cm×10 cm.

Figure 4:
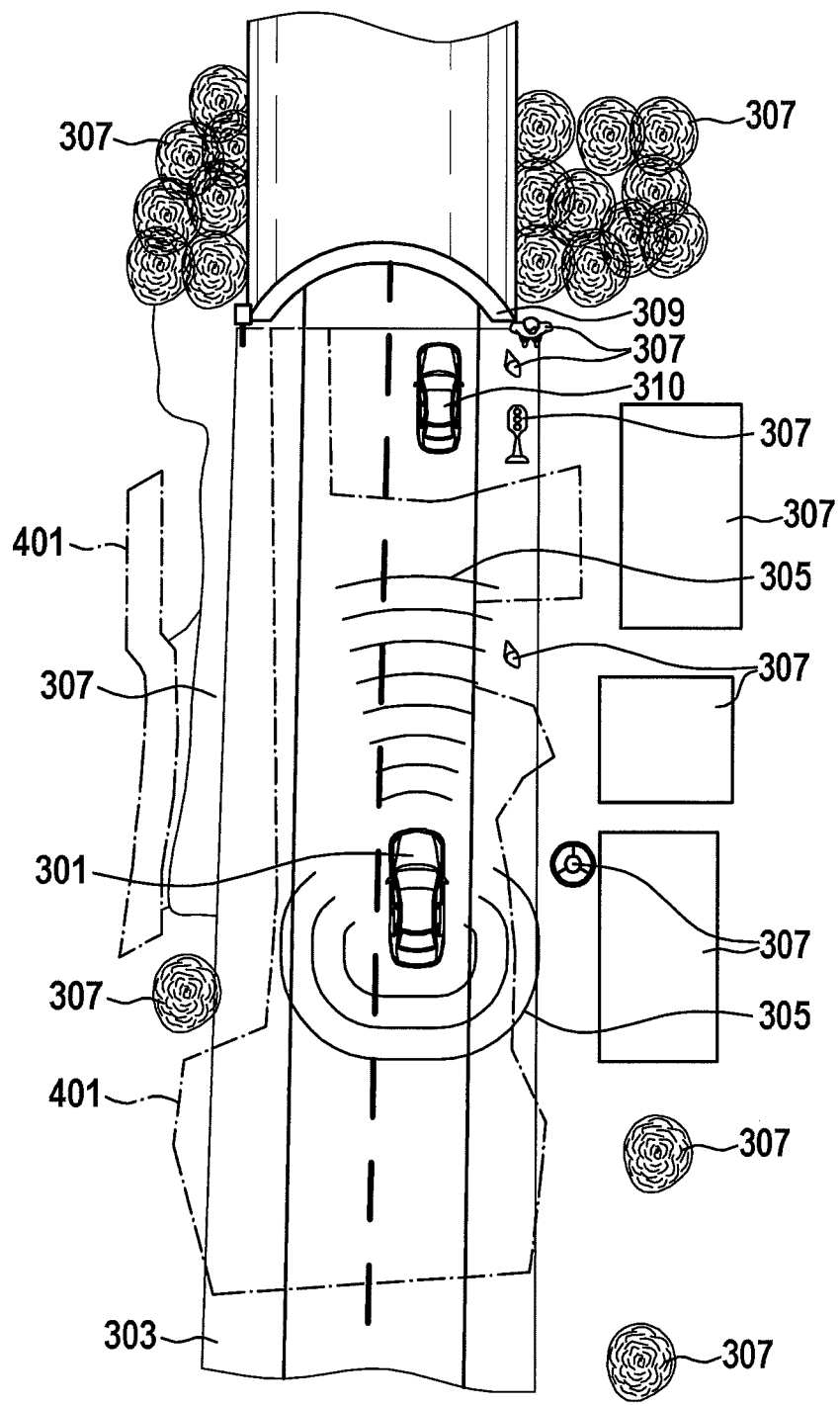
FIG. 4 shows an ascertainment or a calculation of a configuration space based on the clearance according to FIG. 3.

FIG. 4 shows this ascertained configuration space. This is marked by reference numeral 401. It can be seen that configuration space 401 is less greatly extended than clearance 301 according to FIG. 3. This is so since now still another size and an orientation of vehicle 301 have been taken into account. That is, even if vehicle 301 were traveling at the boundary of configuration space 401, but on the inside of configuration space 401, vehicle 301 would not collide with objects 307, 310, which are located directly at the boundary of configuration space 401, but outside configuration space 401.

Figure 5:
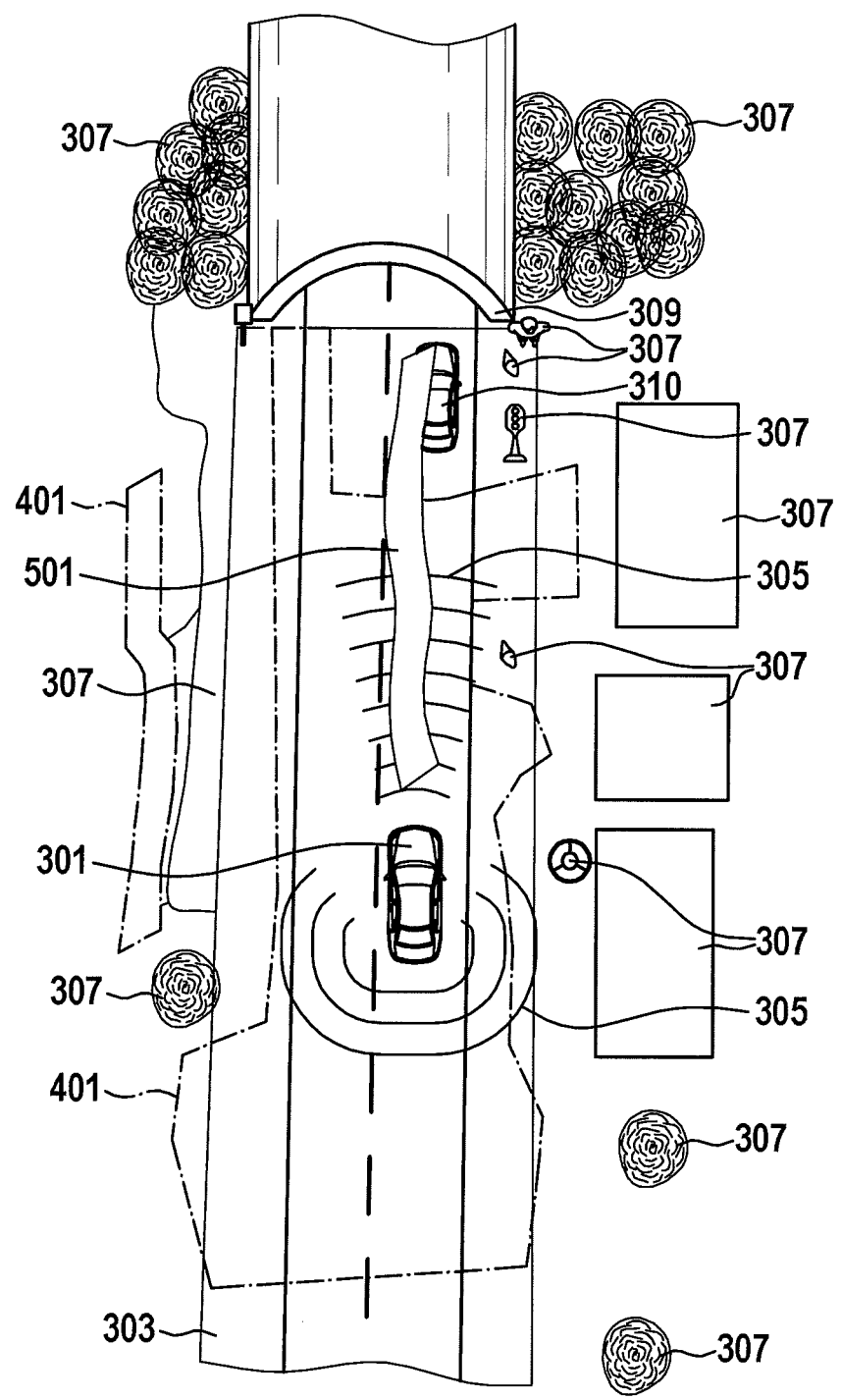
FIG. 5 shows a checking of a collision-prone setpoint trajectory, based on the configuration space according to FIG. 4.

FIG. 5 shows the checking of a collision-prone setpoint trajectory which has been ascertained or calculated. Reference numeral 501 points to this collision-prone setpoint trajectory. It can be seen that setpoint trajectory 501 does not lie completely within configuration space 401. It lies partially outside configuration space 401. Driving on this trajectory 501 would thus lead to vehicle 301 colliding with vehicle 310 before tunnel 309. In this case, collision-prone setpoint trajectory 501 is discarded and a new setpoint trajectory is ascertained.

The present invention may advantageously be used particularly for highly automated and autonomous driving. In particular, the present invention may also be used in automation technology and robotics. That is to say that the setpoint trajectory may also be a setpoint trajectory of an automation device, an automation system, an automation machine or a robot. The explanations provided in connection with the vehicle also apply analogously for the use of a robot or an automation machine or an automation system. That is to say that in the explanations provided above and below, in further aspects and specific embodiments of the present invention, instead of vehicle it could say automation device, automation system, automation machine or robot.

Thus, in summary, a monitoring device and a monitoring method are provided for highly automated driving. The monitoring device according to the present invention or the monitoring method according to the present invention are based on clearance measurements which are able to be carried out by a single sensor, for example, such as a lidar sensor or a high-resolution radar sensor, or by a combination of a plurality of surround sensors such as a radar sensor as well as a stereovideo camera. That is, at least one surround sensor is required for the present invention, which is able actively to measure or record a clearance in the surroundings of the vehicle. In one specific embodiment, advantageously, object measurements of other existing surround sensors may be taken into consideration as an exclusion criterion into the clearance determination or the clearance ascertainment. The clearance measurement may be represented in a grid-based or a particle-based manner.

In this context, in particular, it is not of especially great relevance that the clearance which actually exists be measured accurately and completely. It only has to be ensured, as a rule, that at the locations or the areas, at which the surround sensor is measuring a clearance, there actually is a clearance. From a point of view of the trajectory check, it is therefore only important that the clearance measurement does not supply any false positives. The rate of false negatives is unimportant and does not have an effect on safety, but at most on an availability of the monitored overall system (that is, for example, the setpoint trajectory calculating device) which ascertains or calculates the setpoint trajectory.

What is claimed is:

1. A method for monitoring a setpoint trajectory of a vehicle, the method comprising:
    recording the surroundings of the vehicle;
    ascertaining a clearance, defining an area having no detected objects, based on the recorded surroundings;
    calculating a configuration space as the clearance minus an area based on a size and orientation of the vehicle; and
    checking the setpoint trajectory for freedom from collision based on comparing the setpoint trajectory to the configuration space.

2. The method of claim 1, wherein the clearance and the configuration space are defined using a grid including a plurality of cells.

3. The method of claim 1, wherein the configuration space describes collision-free trajectories of the vehicle, and the setpoint trajectory is checked for freedom from collision by checking if it lies completely in the configuration space.

4. The method of claim 2, wherein the calculating of the configuration space includes convoluting the clearance with a model of the vehicle size and orientation, so that the configuration space is ascertained as a set of the plurality of cells which are all characterized as drivable.

5. The method of claim 1, wherein the surroundings of the vehicle are recorded using a plurality of sensors, and the clearance is ascertained to include only those areas of the surroundings in which all the surround sensors have detected no objects.

6. The method of claim 4, wherein the checking of the setpoint trajectory for freedom from collision includes checking whether the setpoint trajectory lies completely in the set of cells.

7. The method of claim 5, wherein the plurality of sensors includes at least one object sensor and at least one clearance sensor.

8. The method of claim 7, wherein the object sensor includes at least one of: a radar sensor, or a camera.

9. The method of claim 7, wherein the clearance sensor includes a laser-based sensor.

10. The method of claim 1, wherein the clearance is ascertained without considering movement of the detected objects.

11. A device for monitoring a setpoint trajectory of a vehicle, the device comprising:
    a recording device to record surroundings of the vehicle; and
    a processing device to:
        ascertain a clearance, defining an area having no detected objects, based on the recorded surroundings,
        calculate a configuration space as the clearance minus an area based on a size and orientation of the vehicle, and
        check the setpoint trajectory for freedom from collision based on comparing the setpoint trajectory to the configuration space.

12. The device of claim 11, wherein the clearance is defined using a grid including a plurality of cells.

13. The device of claim 11, wherein the configuration space describes collision-free trajectories of the vehicle, and wherein the setpoint trajectory is checked for freedom from collision by checking if it lies completely in the configuration space.

14. The device of claim 11, wherein the calculating the configuration space includes convoluting the clearance with a model of the vehicle size and vehicle orientation, so that the configuration space is ascertained as a set of the plurality of cells which are all characterized as drivable.

15. The device of claim 14, wherein the checking of the setpoint trajectory for freedom from collision includes checking whether the setpoint trajectory lies completely in the set of cells.

16. The device of claim 11, wherein the surroundings of the vehicle are recorded using a plurality of sensors, and the clearance includes only those areas of the surroundings in which all the surround sensors have detected no objects.

17. The device of claim 16, wherein the plurality of sensors includes at least one object sensor and at least one clearance sensor.

18. The device of claim 11, wherein the clearance is ascertained without considering movement of the detected objects.

19. A non-transitory machine-readable storage medium having program instructions, which when executed by a processor perform a method for monitoring a setpoint trajectory of a vehicle, the method comprising:
    recording the surroundings of the vehicle;
    ascertaining a clearance, defining an area having no detected objects, based on the recorded surroundings;
    calculating a configuration space as the clearance minus an area based on a size and orientation of the vehicle; and
    checking the setpoint trajectory for freedom from collision based on comparing the setpoint trajectory to the configuration space.

20. The non-transitory machine-readable storage medium of claim 19, wherein the clearance and configuration space are defined using a grid including a plurality of cells.

21. The non-transitory machine-readable storage medium of claim 19, wherein the configuration space describes collision-free trajectories of the vehicle, and the setpoint trajectory is checked for freedom from collision by checking if it lies completely in the configuration space.

22. The non-transitory machine-readable storage medium of claim 19, wherein the calculating of the configuration space includes convoluting the clearance with a model of the vehicle size and orientation, so that the configuration space is ascertained as a set of the plurality of cells which are all characterized as drivable.

23. The non-transitory machine-readable storage medium of claim 22, wherein the checking of the setpoint trajectory for freedom from collision includes checking whether the setpoint trajectory lies completely in the set of cells.

24. The non-transitory machine-readable storage medium of claim 19, wherein the surroundings of the vehicle are recorded using a plurality of sensors, and the clearance is ascertained to include only those areas of the surroundings in which all the surround sensors have detected no objects.

25. The non-transitory machine-readable storage medium of claim 24, wherein the plurality of sensors includes at least one object sensor and at least one clearance sensor.

26. The non-transitory machine-readable storage medium of claim 19, wherein the clearance is ascertained without considering movement of the detected objects.

* * * * *